United States Patent Office 2,795,332
Patented June 11, 1957

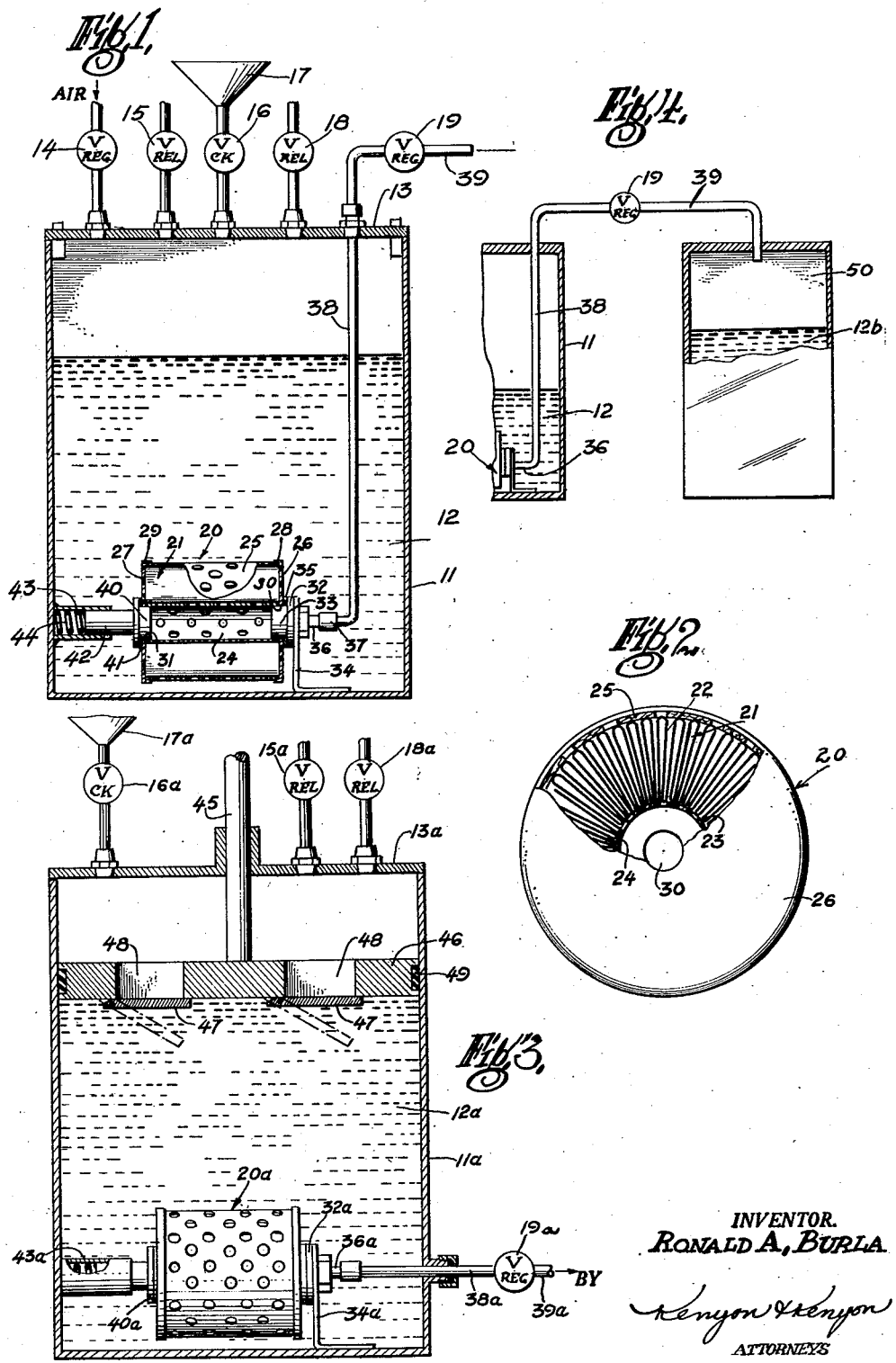

2,795,332

APPARATUS FOR FILTERING CONTAMINANT-CONTAINING COATING LIQUIDS

Ronald A. Burla, Cranford, N. J., assignor to Purolator Products, Inc., Rahway, N. J., a corporation of Delaware Application July 9, 1953, Serial No. 366,955

3 Claims. (Cl. 210—136)

This invention relates to the filtering of contaminant-containing liquids such as varnish, paint, or the like.

It is a principal object of this invention to provide a method for removal of impurities from contaminant-containing liquids, such as varnish, paint, or the like.

It is a further object of this invention to provide an apparatus for this purpose.

In spray operations with such liquids as varnish, paint, coating fluids, or impregnating fluids, the removal of impurities has presented a serious problem. It has been found that frequent shut-downs of the spray gun or other portions of the apparatus are necessitated because of clogging caused by dirt, chips, lint, filings, or other contaminants. Also, in operations such as found in the new plastic metallizing industry, fluids such as varnish are used for dipping purposes. The dipping of desired objects into such fluids causes impurities to be added by the object dipped. The varnish or other fluid must be thoroughly freed of these impurities for dippings therein of subsequent objects. It must, therefore, be cleaned. Several approaches have been made to the problems presented such as using cheesecloth or wire strainers or waste-type filters for ridding the spray or dipping fluid of its impurities, but none of these has proved successful.

Solutions for these problems are presented by this invention and include the use of a filter capable of removing fine contaminating particles without excessive pressure drop therethrough and without danger of depositing more impurities, such as lint, into a system including the filter, as would occur with waste or fabric types of filters. This invention provides a filter system which satisfies these requirements. The system of this invention includes the immersion of a pleated paper-type element in the liquid which it is desired to clean and keep clean and the forcing of all the liquid through it. The details of the invention are described in the following description and shown in the accompanying drawings wherein:

Fig. 1 is a schematic view of a tank and spray system embodying the invention and including a filter installed in an appropriate location in the system to effect necessary filtering action for the spray fluid;

Fig. 2 is an end view partially broken away and partially in section of the filter of Fig. 1;

Fig. 3 is a view similar to that of Fig. 1 of an alternative system; and

Fig. 4 is a view similar to that of Fig. 1 of a variant thereof.

Referring first to Fig. 1, a tank 11 is provided to receive varnish or other liquid 12 which is to be rid of its impurities. The top 13 of the tank is removable and carries conventional fittings such as an air inlet valve 14, a safety valve 15, a filling valve 16, a filling funnel 17, a vent valve 18, and an outlet valve 19. A filter element 20 is mounted in the tank 11 adjacent to its bottom as shown.

This filter element 20 is preferably a cylindrical, pleated, resin impregnated paper type of element. For example, this filter element 20 may be one of those embodied in Bell U. S. Patent No. 2,642,187. Such element 20 includes a pleated body 21 of filter paper, or the like, preferably impregnated with phenol-formaldehyde resin solution as is well known in the art. This pleated body 21 has individual pleats 22 as is shown in Fig. 2, and is formed into a tubular annulus with the pleats 22 extending substantially radially of the axis of the annulus. The inner longitudinal folds 23 of the radially disposed pleats 22 abut a perforated center tube 24 concentric with the annulus defined by the pleated body 21. A perforated wrapping or cover 25 optionally envelopes the outer longitudinal folds of the pleats, also being concentric with said annulus.

End caps 26 and 27 are positioned at opposite ends of the tubular annulus defined by the pleated body 21. These end caps have turned down rims 28, 29. These end caps 26 and 27 close off the end openings of the pleats 22 and are appropriately cemented to end edges of said pleats, for example, as described in said Bell patent to prevent leakage through the end openings of said pleats. The caps 26 and 27 have end openings 30 and 31 communicating respectively with the opposite ends of the perforated center tube 24.

The filter element 20 is supported removably between a hollow plug 32 extending, for example, into the opening 30 of one of the end caps 26. Plug 32 has an internal passage 33 for purposes presently to be described. The plug 32 is carried by a bracket 34 secured to the wall of tank 11 in any appropriate manner. A sealing gasket 35 prevents leakage around the plug 30. A pipe 36 is connected to the hollow plug 30 communicating with its passageway 33. Pipe 36 is connected by a coupling 37 and an extension pipe 38 which leads through the removable top 13 of the tank 11 to the outlet valve 19. The pipe 39 from valve 19 leads filtered fluid from the tank 12 for use as desired.

A solid plug 40 is used to close off the opposite end of center tube 24 of filter 20 by fitting into the opening 31 in the end cap 27. A suitable sealing gasket 41 prevents leakage around plug 40. The plug 40 has an external stem 42 which fits slidably within a tube 43 appropriately supported from a wall of tank 11. A coil spring 44 within the tube 43 acts against stem 42 to bias the plug 40 into pressing engagement with the end cap 27 and thus to maintain the filter element 20 removably supported between the two end plugs 32 and 40.

The operation of the system of Fig. 1 is as follows:

With vent valve 18 open, the tank 11 is filled with contaminated or impurity-containing varnish or other liquid 12 via funnel 17 and opened filling valve 16. Vent valve 18 and filling valve 16 are then closed and air inlet valve 14 is opened to admit air under pressure to tank 11 and its contents. Outlet valve 19 is then opened. The only egress for fluid from tank 11 is via the pipes 36, 38 and 39. In order to reach these pipes, the fluid 12 in tank 11 must flow through the components of the filter element 20 from the outside in, namely, through perforated wrapper 25, the pleated body 21 of filter paper and into the perforated tube 24, and out of the latter through the passageway 33 in hollow plug 32 and thence successively to pipes 36, 38 and 39. The forced flow of fluid 12 through the filter element 20 as just described is caused by the pressure of air introduced into the tank 11 via air inlet valve 14.

In its forced passage through the filter element 20 as just described, the contaminated fluid 12 in tank 11 is freed of its solid impurities which are trapped and retained by the walls of the pleats 22 of the body 21 of filter paper of filter element 20.

When the filter element 20 becomes clogged by a large accumulation on its filtering surfaces of solid impurities, it is a simple matter to replace it by a fresh filter element 20 by removing the top or cover 13 of the tank 11 and dismounting the dirty filter element 20 from its plugs 32 and 40 and by mounting a fresh filter element 20 between said plugs.

The pipe 39 from valve 19 carrying filtered fluid forced from tank 11 may be connected to a spray gun (not shown) if spraying is desired, or may be led to a dip container (not shown) if a dipping process is carried out with the filtered liquid delivered from tank 11.

A modified arrangement for providing pressure for forcing contaminated liquid of the kind described through a filter element is shown in Fig. 3.

In this figure, the filter element 20a identical with that of filter element 20 is supported within tank 11a containing contaminated liquid 12a which it is desired to filter in exactly the same way as filter element 20 of Fig. 1. Element 20a is carried between hollow end plug 32a supported by bracket 34a and a spring biased plug 40a. Pipes 36a and 38a lead off filtered fluid that has passed through filter element 20a to outlet valve 19a and thence to pipe 39a.

The removable cover 13a of tank 11a is fitted with a relief or safety valve 15a, a vent valve 18a, a filler valve 16a and filling funnel 17a. A piston rod 45 is fitted slidably in the top 13a and carries a piston 46 movable internally of the tank 11a. One way valves, such as flap valves 47, are carried by piston 46 for cooperation with passages 48 thereof. A piston washer or ring 49 is also provided for the piston 46. The flap valves 47 open downwardly relative to their openings 48 so that fluid 12a entering tank 11a via funnel 17a and check valve 16a will freely pass through the passageways 48 to fill the tank 11a below said piston 46.

When the piston 46 is forced downward by external pressure applied, for example, by conventional power means (not shown) or by hand pressure applied to its piston rod 45, its one way valves 47 close and force flow of fluid in tank 11a below said piston under pressure through the filter element 20a.

If care is taken to keep piston 46 and also its one way valves 47 always immersed and in contact with fluid 12a in the tank 11a, no hardening of liquid will occur about the valves 47 to interfere with their proper operation or with operation of the piston in the tank. The fluid of tank 11a that is forced through filter elements 20a can only pass from tank 11a via pipes 36a and 38a and valve 19a to pipe 36a whence it may be delivered for use in a spray gun (not shown) or for dipping purposes as may be desired. Filter element 20a functions in the same way as filter element 20 to rid the fluid 12a of tank 11a of its impurities, and said element 20a may be replaced when clogged in the same way as filter element 20.

A further manner of securing pressure flow of fluid of the character described through a filter element can be achieved by slight modification of the apparatus of Fig. 1. Such modification merely requires either the elimination of air pressure inlet valves 14 of that figure or its closure, the opening of vent valve 18 and the connection of pipe 39 to an evacuated tank 50. In such case, when outlet valve 19 of tank 11 is opened, air at atmospheric pressure above the level of fluid 12 in tank 11 will force flow of said fluid 12 in tank 11 through its filter element 20 and via pipes 36 and 38, valve 19 and pipe 39 into said evacuated tank 50 because of the differential of pressure between the two tanks 11 and 50.

Filtered fluid 12b collected in tank 50 may be withdrawn from the latter for use with a spray gun (not shown) or piped to a dipping tank (not shown).

Thus it can be seen that the apparatus and methods herein described provide a highly desirable and useful end product, namely, varnish, paint or other like liquids, that is entirely free of harmful impurities, such as dirt chips, lint filings, or other solid contaminants that would interfere with spray gun operation, or dipping processes in which said product is used. Speed of operation, low pressure loss through the filter, ready removal and replacement of clogged filters and the production of desired contaminant free liquid are the results of practicing this invention and fulfill a long felt need and want in the various industries requiring the aforementioned end product.

While specific embodiments of the invention have been disclosed, variations are possible within the scope of the claims and are contemplated. There is no intention therefore of limitation to the exact details shown and described.

What is claimed is:

1. An apparatus for filtering contaminant-containing coating liquids of the character described comprising a tank containing said liquid, a replaceable filter element completely immersed in liquid in said tank, said element including a perforated center tube and a filter medium surrounding said tube, means for supporting said element replaceably within said tank and submerged in said liquid, said last-named means including a bracket, a hollow plug carried by the bracket and extending into one end of said center tube, another plug member extending into the other end of said center tube, and spring biasing means coacting with said last-named plug member and urging it against one end of said filter element, pressure means for forcing said liquid through said filter medium and into said center tube to filter said liquid and means connected to said hollow plug for conveying the filtered liquid away from said tube and out of said tank.

2. An apparatus for filtering contaminant-containing coating liquids of the character described comprising a tank containing said liquid, a replaceable filter element completely immersed in liquid in said tank, said element including a perforated center tube and a filter medium surrounding said tube, means for supporting said element replaceably within said tank and submerged in said liquid, said last-named means including a bracket, a hollow plug carried by the bracket and extending into one end of said center tube, another plug member extending into the other end of said center tube, and spring biasing means co-acting with said last-named plug member and urging it against one end of said filter element, pneumatic pressure means for forcing said liquid through said filter medium and into said center tube to filter said liquid and means connected to said hollow plug for conveying the filtered liquid away from said tube and out of said tank.

3. An apparatus for filtering contaminant-containing coating liquids of the character described comprising a tank containing said liquid, a replaceable filter element completely immersed in liquid in said tank, said element including a perforated center tube and a filter medium surrounding said tube, means for supporting said element replaceably within said tank and submerged in said liquid, said last-named means including a bracket, a hollow plug carried by the bracket and extending into one end of said center tube, another plug member extending into the other end of said center tube, and spring biasing means co-acting with said last-named plug member and urging it against one end of said filter element, piston pressure means for forcing said liquid through said filter medium and into said center tube to filter said liquid and means connected to said hollow plug for conveying the filtered liquid away from said tube and out of said tank, and said piston pressure means also including one way valve means.

References Cited in the file of this patent

UNITED STATES PATENTS

| Number | Name | Date |
| --- | --- | --- |
| 565,973 | Fowler | Aug. 18, 1896 |
| 633,311 | Gaylord | Sept. 19, 1899 |
| 751,810 | Rice | Feb. 6, 1904 |
| 1,861,537 | Leek | June 7, 1932 |
| 2,089,214 | Lomax | Aug. 10, 1937 |
| 2,334,664 | Wicks | Nov. 16, 1943 |
| 2,378,737 | Simkovits | June 19, 1945 |
| 2,619,231 | Abbott | Nov. 25, 1952 |
| 2,642,187 | Bell | June 16, 1953 |